(No Model.) 6 Sheets—Sheet 1.

G. WESTINGHOUSE, Jr.
DRAW GEAR AND BUFFING APPARATUS.

No. 543,915. Patented Aug. 6, 1895.

WITNESSES
T. J. Hogan
F. E. Gaither

INVENTOR
Geo. Westinghouse Jr.
by J. Snowden Bell
atty (No Model.) 6 Sheets—Sheet 2.
G. WESTINGHOUSE, Jr.
DRAW GEAR AND BUFFING APPARATUS.
No. 543,915. Patented Aug. 6, 1895.
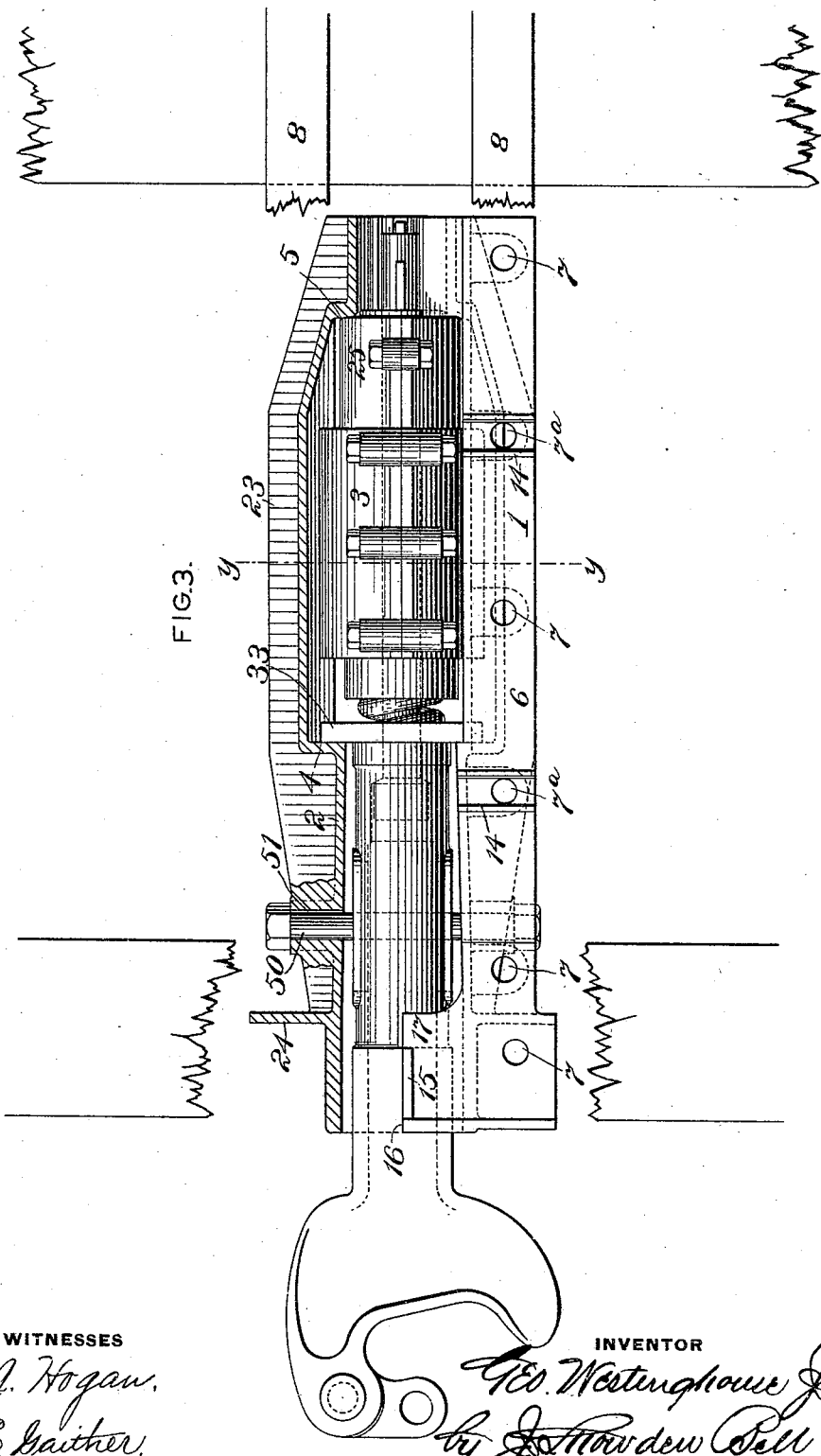
WITNESSES
T. J. Hogan
F. E. Gaither
INVENTOR
Geo. Westinghouse Jr.
by J. Snowden Bell atty (No Model.) 6 Sheets—Sheet 3.
G. WESTINGHOUSE, Jr.
DRAW GEAR AND BUFFING APPARATUS.
No. 543,915. Patented Aug. 6, 1895.
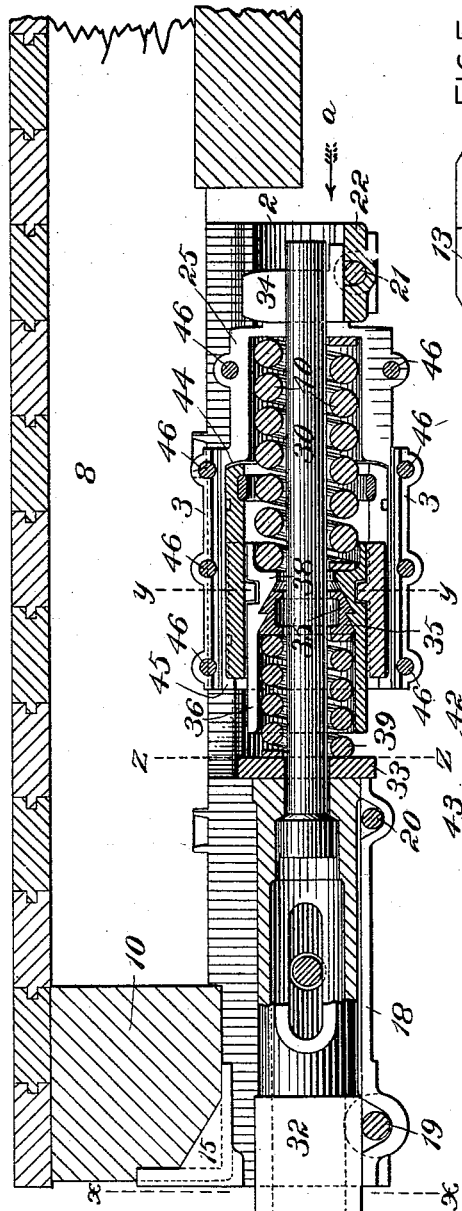
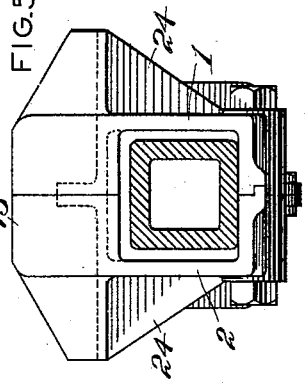
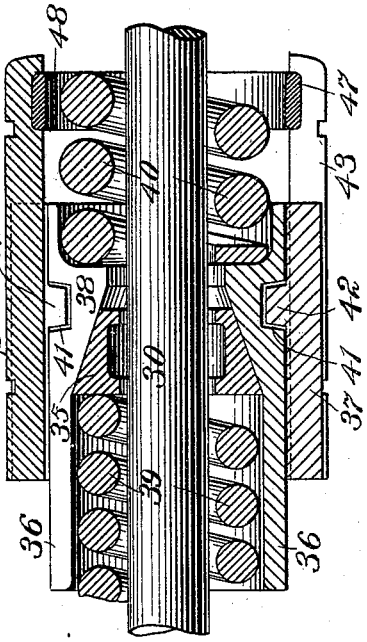
WITNESSES
T. J. Hogan.
F. E. Gaither
INVENTOR
Geo. Westinghouse Jr.
by J. Snowden Bell
atty (No Model.) 6 Sheets—Sheet 4.

G. WESTINGHOUSE, Jr.
DRAW GEAR AND BUFFING APPARATUS.

No. 543,915. Patented Aug. 6, 1895.

WITNESSES
T. J. Hogan
F. E. Gaither

INVENTOR
Geo. Westinghouse Jr.
by J. Snowden Bell
atty.

(No Model.) 6 Sheets—Sheet 5.

G. WESTINGHOUSE, Jr.
DRAW GEAR AND BUFFING APPARATUS.

No. 543,915. Patented Aug. 6, 1895.

WITNESSES
INVENTOR (No Model.) 6 Sheets—Sheet 6.
G. WESTINGHOUSE, Jr.
DRAW GEAR AND BUFFING APPARATUS.
No. 543,915. Patented Aug. 6, 1895.
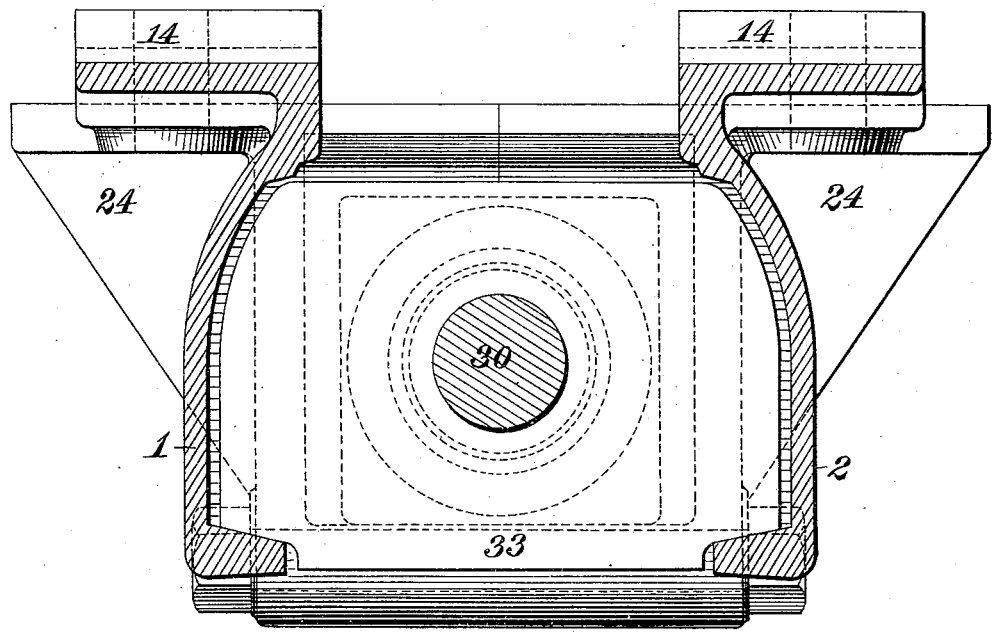
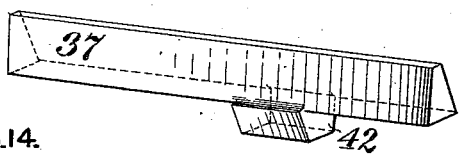
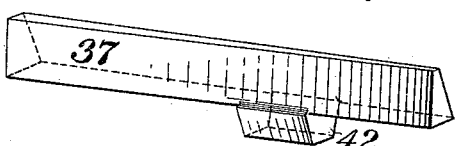
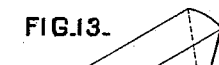
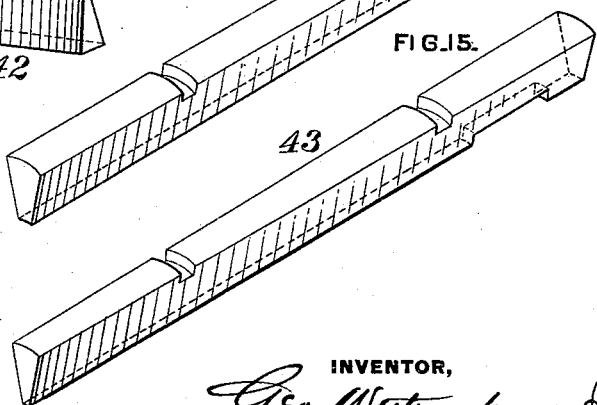
WITNESSES: INVENTOR,

UNITED STATES PATENT OFFICE.

GEORGE WESTINGHOUSE, JR., OF PITTSBURG, PENNSYLVANIA.

DRAW-GEAR AND BUFFING APPARATUS.

SPECIFICATION forming part of Letters Patent No. 543,915, dated August 6, 1895.

Application filed July 21, 1894. Serial No. 518,212. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered a certain new and useful Improvement in Draw-Gears and Buffing Apparatus, of which improvement the following is a specification.

The object of my invention is to attain increased effectiveness in the draw-gear and buffing apparatus of railway-cars; and to this end my invention consists in an improved friction-buffer for absorbing momentum and modifying the shocks of draft and buffing, in an improved construction and combination of parts by which the draw-gear and buffing apparatus are maintained in operative relation and secured to the framing of a car, and in certain details of construction, all as hereinafter fully set forth.

Figure 1:
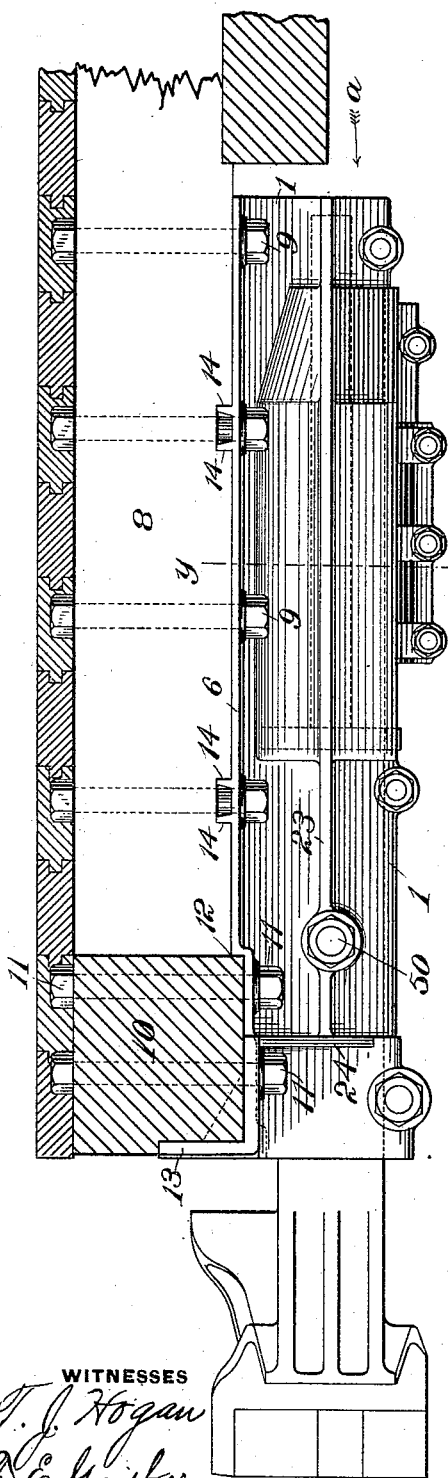
Figure 2:
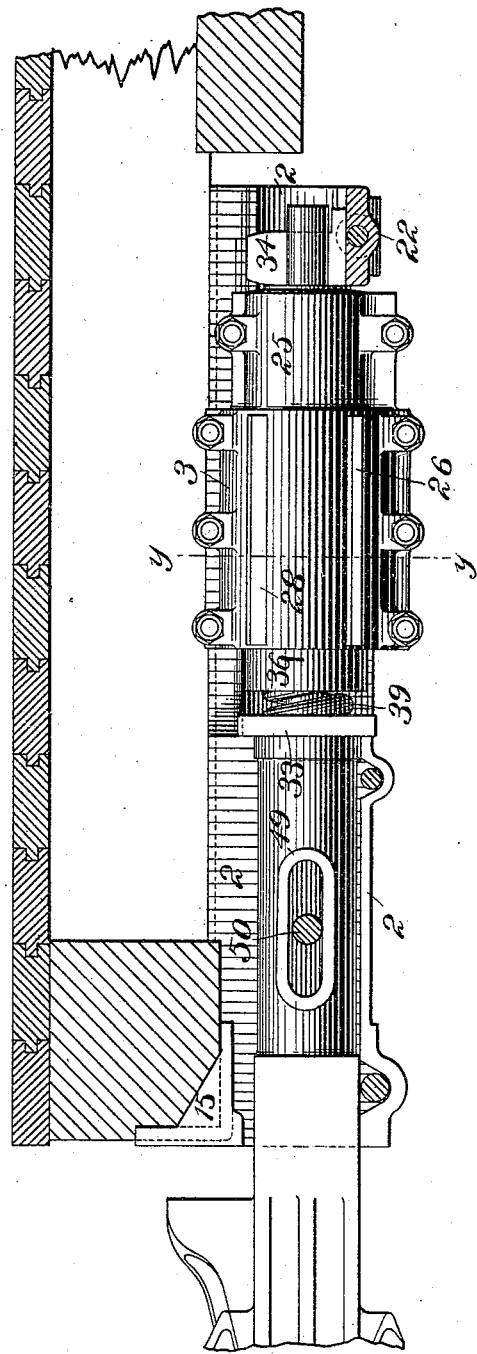
Figure 7:
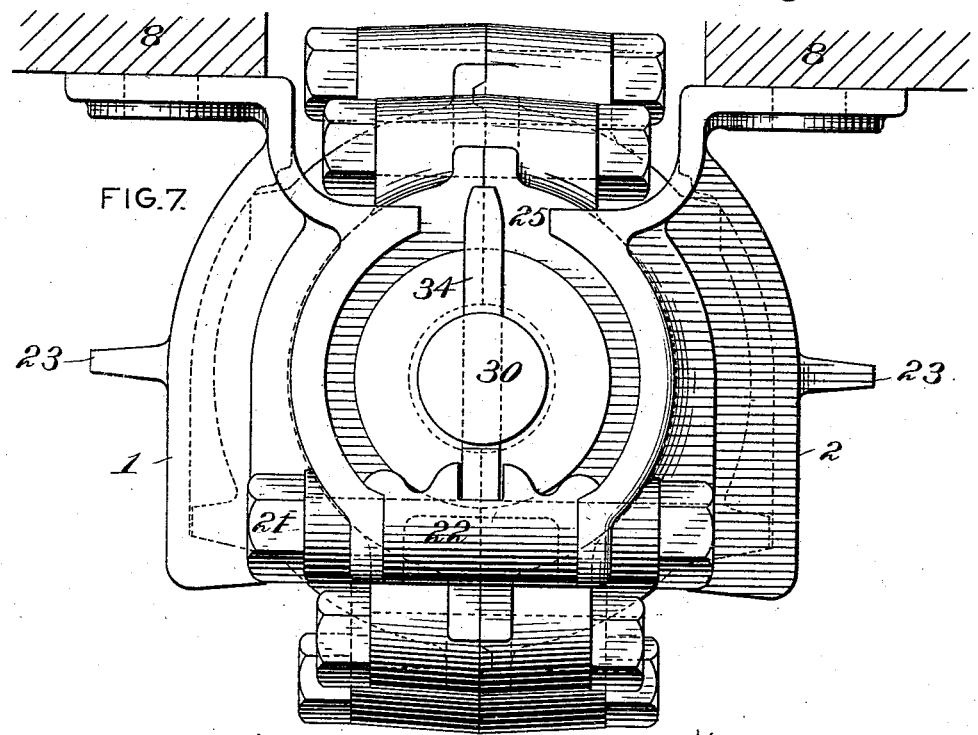
Figure 8:
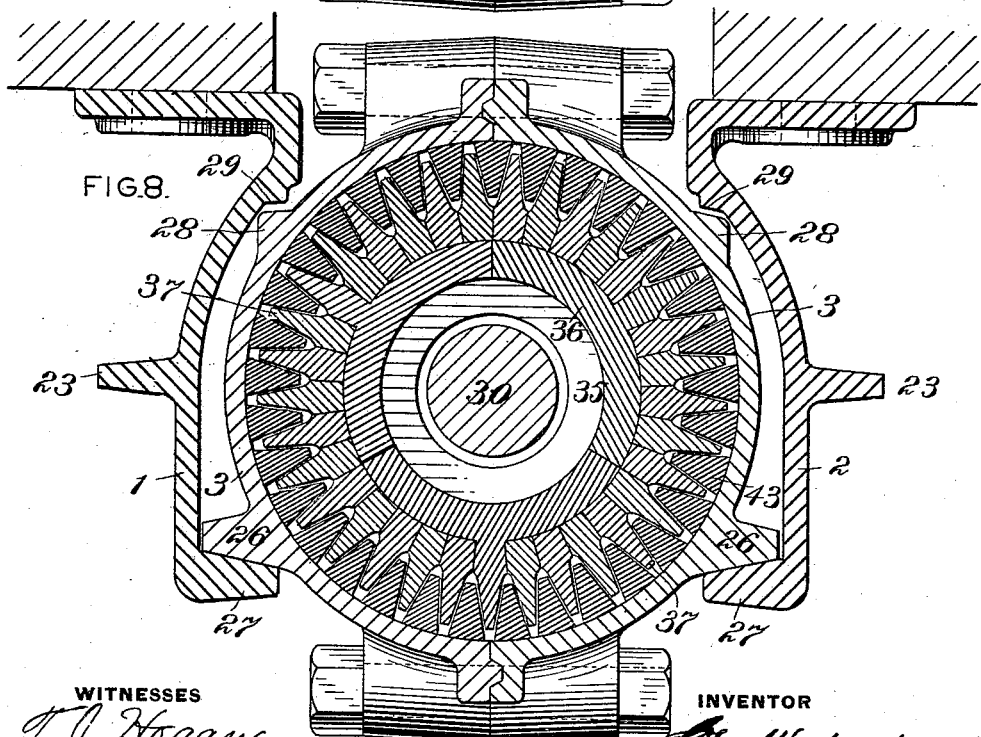
Figure 9:
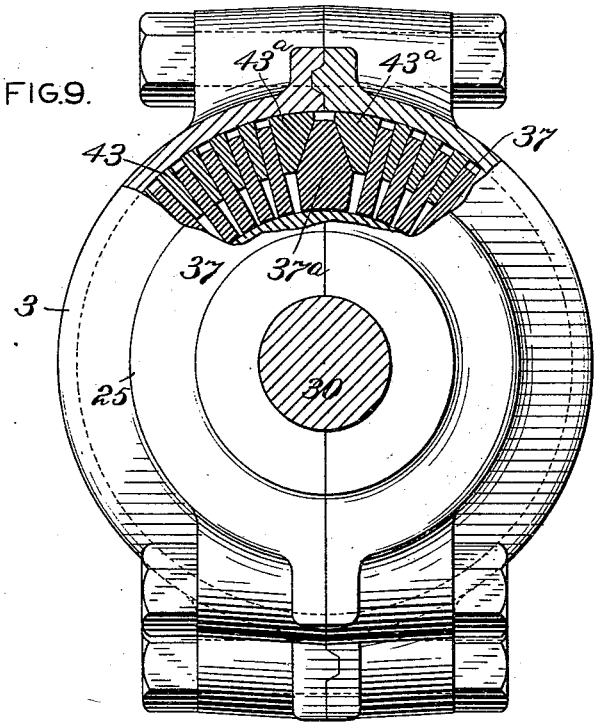
Figure 10:
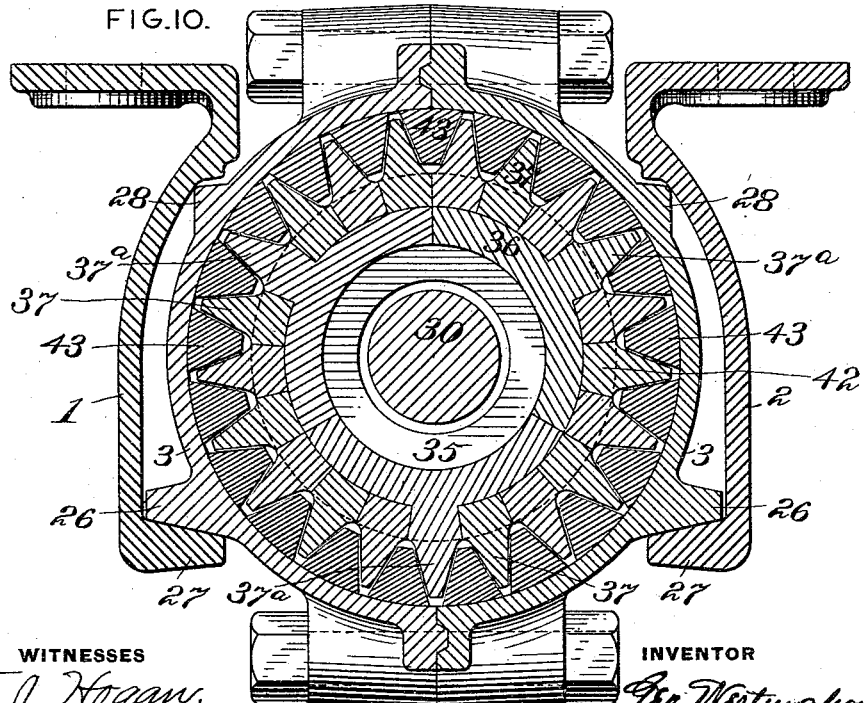

In the accompanying drawings, Figure 1 is a side view in elevation illustrating an embodiment of my invention attached to the end timbers of a car; Fig. 2, a side elevation of the parts within the outer frame or casing, one-half of said outer frame or casing being removed; Fig. 3, a plan view, partly in section, looking from above, one-half of the outer frame or casing being shown in section; Fig. 4, a vertical central longitudinal section; Fig. 5, an end elevation of the outer frame or casing with the draw-bar shown in section on the line $x$ $x$ of Fig. 4; Fig. 6, a vertical central longitudinal section, on an enlarged scale, of a portion of the buffing apparatus, showing a modification of the construction shown in Fig. 4; Fig. 7, an end elevation, on a further enlarged scale, looking in the direction of the arrow marked $a$ in Fig. 4; Fig. 8, a transverse section on the line $y$ $y$ of Fig. 4; Fig. 9, an end elevation and partial section showing a modified form of the friction devices; Fig. 10, a transverse section similar to that shown in Fig. 8, but illustrating a preferred construction in which the number of parts is fewer than shown in Fig. 8 and in which the angle of the frictional surfaces is greater; Fig. 11, a transverse section on the line $z$ $z$ of Fig. 4; Fig. 12, a perspective view showing one form of the inner beveled or wedge-shaped friction-bars which are carried by and interlock with the cylindrical segments or carriers surrounding the central wedge-block; Fig. 13, a perspective view showing one form of the outer beveled friction-bars which are located in the spaces between the inclined surfaces of the inner beveled friction-bars; Fig. 14, a perspective view showing an inner beveled or wedge-shaped friction-bar which is tapered longitudinally, and Fig. 15 a similar view of an outer beveled or wedge-shaped friction-bar which is tapered longitudinally.

My present invention is an improvement on the apparatus shown, described, and claimed by me in my several Letters Patent No. 391,997, dated October 30, 1888, and Nos. 499,335 and 499,336, dated June 13, 1893. The outer casing or frame, which may be made of cast malleable iron or steel, consists of but two parts, which when bolted together and secured to the end timbers of a car form a strong, stiff, strengthening frame for binding together the end timbers of the car and forming with them a rigid structure capable of withstanding the most severe shocks of draft and buffing. When secured together they also combine in a single structure composed of but two parts, a buffer-iron or striking-plate, a draw-bar stirrup, guide, and support, an inclosing casing for the whole of the draw-gear and buffing apparatus, a guide and support for the housing of the friction buffing devices, and stops for limiting the longitudinal movement of the parts. The outer casing or frame, composed of the sections 1 and 2, which are bolted together, has a hollow or box-like portion, closed at the bottom and open at the top, and approximately rectangular in cross-section, for containing the draw-bar, and a somewhat larger portion for containing the housing 3, which carries and incloses the springs and friction buffing mechanism. This latter portion is open at the top and bottom, its sides are curved approximately to the form of the housing 3, and its ends form shoulders 4 and 5, which serve as stops for the follower-plate 33, and for the inner end of the housing and limit the inward and outward longitudinal movement of the parts.

On the upper side of each of the sections 1 and 2 of the outer casing or frame is formed a flange 6, in which are formed bolt-holes for securing the frame or casing to the draft-timbers 8 by means of the bolts 9 and to the end sill 10 by means of the bolts 11. A shoulder 12 on the upper side of the flange 6 fits the lower inner edge of the end sill 10, and a striking-plate 13 extends upward from the flange and is fitted to the outer face of the end sill, against the bottom of which the flange 6 is bolted, thereby forming a strong rigid connection between the sill and the casing or frame when the casing or frame is secured in place. On the upper side of the flange 6 projections or ribs 14 are formed on each side of the bolt-holes 7ª, which project into grooves cut out for them in the under side of the draft-timbers 8, and which fit closely against the sides of the grooves. These ribs tend to prevent longitudinal movement of the frame relatively to the draft-timbers, and they may be formed on each side of each of the bolt-holes; or, if preferred, they may be located, either singly or in pairs, at other points on the frame, or they may be made circular in form and fitted into counterbores in the sill around the bolt-holes.

The outer end flange which forms the striking-plate 13 is of greater thickness than the upper longitudinal flange 6, and it is further strengthened by means of brackets 15, which are formed integral with it and fitted into the lower front part of the end sill. The outer face of the striking-plate is flush with the outer ends of the sides and bottom of the casing, which form the draw-bar stirrup or support.

When the two sections 1 and 2 of the casing or frame are put together, the edges 16 of the striking-plate, the sides of the brackets 15, and the edges of the parts 17 fit closely together above the draw-bar, and the edges 18 below the draw-bar may also fit closely throughout their length and form a joint extending from the follower-plate to the outer end of the frame, or, if preferred, the edges 18 may be fitted to form a joint near the bolts 19 and 20, and the intervening portion may be cut away, so as to leave an opening in the under side of the draw-bar box.

The two sections 1 and 2 are firmly secured together near the outer end and middle by means of bolts 19 and 20, which pass through the bottom of the draw-bar box, and at the inner end by the bolt 21, which passes through the two sections of the frame and through a spacing piece or strut 22, which is fitted between the sections.

Longitudinal strengthening-flanges 23 are formed on the outside of each of the sections 1 and 2, and extend from the inner ends of the sections outwardly to the brackets 24. These flanges stiffen and strengthen the whole frame longitudinally, and the brackets 24 support and strengthen the widened portion of the flange 6 near the outer end of the frame.

A substantially cylindrical housing 3, which contains the friction buffing mechanism, is located within the enlarged portion of the outer frame or casing, and is supported therein by means of flanges 26, formed on the outside of the housing, which bear on the flanges 27, formed on the under sides of the frame or casing sections 1 2. When the housing is in place with the flanges 26 resting on the flanges 27, the guide-ribs 28 on the sides of the housing fit loosely under the shoulders 29 on the inside of the outer casing or frame and serve to prevent any undue upward displacement of the housing.

The housing consists of two substantially cylindrical portions 3 and 25, the larger portion 3 surrounding the friction devices and an extension 25, of smaller diameter, forming a pocket for one end of the spring 40. One end of the smaller cylindrical portion 25 is closed, except as to a central opening through which the draft-pin 30 passes, and this closed end of the housing is adapted to bear against the shoulder 5 on the outer casing, which shoulder forms a stop for limiting the inward movement of the housing. The housing is divided longitudinally into two sections which are secured together by bolts 46, and the meeting edges on the larger cylindrical portion are preferably and as a matter of convenience fitted together with a tongue-and-groove joint.

With the parts in position as shown in Fig. 4, the head 31 of the draft-pin 30 fits in a socket in the draw-bar 32 and the draft-pin passes through the end of the draw-bar and through the follower-plate 33, and extends centrally through the housing nearly to the end of the frame. A key 34 is fitted in a slot in the end of the draft-pin, and its head rests in a groove formed in the strut or block 22, which prevents the key from falling out of place. The draft-pin passes through the center of a conical wedge-block 35, which may have its outer surface formed with a single taper, as shown in Fig. 6, so that the block has the form of a frustum of a cone, or it may have more than one such surface, as shown in Fig. 4, in which the block is shown in the form of a double frustum.

Surrounding the wedge-block are three cylindrically-curved carrier-plates 36, which carry on their outside the friction bars or wedges 37. When placed with their edges together, these carrier-plates form a cylindrical barrel with a thickened inner portion 38, which is tapered or conical in form to fit the conical outer surface of the wedge-block 35. Surrounding the draft-pin 30 is a spring 39, which bears at one end against the follower-plate 33 and at its other end against the wedge-block 35. Another spring 40 surrounds the draft-pin and bears at one end against the closed end of the extension 25 of the housing and at its other end against a shoulder formed by the inner thickened portion 38 of the carriers 36. A circumferential groove 41 is formed on the outside of the carrier-plates 36 and lugs 42, which are formed integral with the wedge-bars 37, project into the groove, and serve to make these wedge-bars and carriers move together, so that any longitudinal movement of the carriers is imparted to the wedge-bars.

The wedge-bars 37, as shown in Figs. 8, 10, and 12, are beveled bars or broad short wedges, which are placed close together around and upon the carrier-plates 36, with their sharp or narrow edges projecting radially outward like the teeth of a gear-wheel. On each of the segments or carrier-plates 36 a wedge-bar 37ª is formed integral with the carrier-plate.

In the spaces between the inclined faces of the wedge-bars 37 are located other wedge-shaped bars 43, with their narrow edges inward and their inclined sides parallel with the inclined sides of the inner wedge-bars. These outer wedge-bars 43 are loosely fitted between a shoulder 44 and the inwardly-projecting flange 45, so that they move longitudinally with the housing 25 but have no longitudinal movement relative thereto, except such as is permitted by their being slightly shorter than the distance between the shoulder 44 and the flange 45. Each of the outer wedge-bars 43 may have a notch 47 in its inner narrow edge, near one end, so that they may be adapted to fit over a ring 48 which tends to limit the radially inward movement of the otherwise unsupported ends of the bars 43.

The bars 37 and 43 may be of uniform thickness or cross-sectional dimensions throughout their length, (as measured on a line parallel to the draft-pin 30,) as shown in Figs. 12 and 13, or they may taper slightly from end to end, as shown in Figs. 14 and 15. When the wedge-bars are tapered longitudinally, as shown in Figs. 14 and 15, the inner wedge-bars 37 are arranged with their thicker ends outward or toward the follower-plate 33, and the outer wedge-bars 43 with their thicker ends inward or next to the shoulder 44.

The draw-bar 32 may be, as shown, provided with longitudinal openings or slots 49 on its opposite sides, and a bolt 50 passed through these slots and through openings 51 formed in the sections 1 and 2 of the outer frame or casing. The bolt 50 is secured in place by a head and nut and fits loosely in the openings 51, so that it may be easily removed when necessary, even though it may be somewhat bent. The object of this construction is to serve as a safeguard in case of accident to prevent the draw-bar from falling on the track.

When the parts are all in position as shown in the drawings and the draw-bar is pushed inwardly with the force incident to it in ordinary use, it bears against the follower-plate 33 and moves the follower-plate, so as to compress the spring 39. The pressure of the compressed spring 39 moves the wedge-block 35 to the right and causes the outer conical surface of the wedge-block 35 to slide relatively to the conical surface on the inside of the carrier-plates, and as the movement to the right of the carrier-plates 36 is resisted by the spring 40 the carrier-plates are forced radially outward and with them the inner wedge-bars 37. If the wedge-block be moved far enough to the right by stronger or more violent impact of the cars the carrier-plates and inner wedge-bars will be forced out far enough to cause the inclined faces of the inner wedge-bars to press on the inclined faces of the outer wedge-bars and force the latter out against the housing 3. A further movement of the draw-bar will compress the spring 39 and move the wedge-block 35 farther to the right and thereby cause the inner wedge-bars 37 to be more tightly wedged between the outer wedge-bars, and this outward wedging action will continue to increase until the follower-plate 33 bears against the ends of the carrier-plates. The carrier-plates and inner wedge-bars will move longitudinally, the spring 40 will be compressed, and since the outer wedge-bars cannot move longitudinally relatively to the housing 3 the inner wedge-bars will slide on the outer wedge-bars and the friction between the inner and outer wedge-bars will resist the movement of the draw-bar. On account of the great amount of friction between the surfaces of the inner and outer wedge-bars the force due to the impact of the cars will be absorbed principally by the friction between the wedge-bars and only to a comparatively small degree by the springs 39 and 40. The advantage of this action is that the return shock of the springs when relieved from compression or tension, which is often very detrimental, may be almost entirely obviated, or reduced to such a small amount that it is immaterial, and since the greater portion of the momentum is absorbed by the friction devices the springs are not subjected to such severe shocks as they are in the ordinary forms of draw-gear. When the pressure on the draw-bar is relieved, the springs 39 and 40 tend to return the parts to the positions shown in Fig. 4, the action of the wedge-block on the carrier-plates ceases, the edges of the carrier-plates 36, which have been separated by the outward movement of the plates, tend to come together again, and the wedge-bars 37 are no longer forced out against the outer wedge-bars 43, but tend to move inward and away from them. This action is insured by the inner wedge-bars 37ª, which are formed integral with the carrier-plates, since they are positively withdrawn from contact with the outer wedge-bars when the pressure of the wedge-block on the carriers ceases, and the withdrawal of the wedge-bars 37ª releases the pressure on all the other bars. When the movement of the draw-bar is in the opposite direction—that is, outward, or to the left, as shown in the drawings—the draft-pin is moved to the left, and the key 34, which passes through the end of the draft-pin, bears on the end of the extension 25 of the housing and moves it to the left and through the spring 40, carrier-plates 36, and wedge-block 35 compressing the spring 39, which acts on the wedge-block 35 and causes it to force the carrier-plates and inner wedge-bars 37 outwardly against the outer wedge-bars. The outer wedging action of the wedge-block on the carriers and wedge-bars will continue to increase with the increase of draft until the ends of the carrier-plates bear against the follower-plate 33 and the further movement of the housing 3 to the left will compress the spring 40 and cause the outer wedge-bars to slide on the inner wedge-bars, and by the frictional resistance so produced the movement of the draw-bar will be checked.

When the bars are formed as shown in Figs. 12 and 13, the wedging action of the bars 37 and 43 is that due to the radially-outward pressure; but when the bars are formed as shown in Figs. 14 and 15 the wedging action is not only that due to the radially-outward movement and pressure, but an additional wedging action is produced by the relative longitudinal movement of the inner and outer wedge-bars, which additional wedging action is due to the longitudinally-tapered form of the bars and causes an increasing frictional resistance.

The constructions shown in Figs. 8 and 10 are substantially the same, the only difference being in the angle of the inclined faces of the wedge-bars and in the number of these bars. In Fig. 8 the number of the wedge-bars is greater than in Fig. 10 and the angle of the wedge-bars is smaller.

In Fig. 9 a number of the inner wedge-bars are formed with their sides parallel—that is, they are rectangular in cross-section, instead of being wedge-shaped—and the outer bars which fit between them are formed with a comparatively small angle between their sides. With this construction a thicker inner wedge-bar 37$^a$ is located at intervals between two thick outer wedge-bars, the angle between the inclined surfaces of these thicker bars being greater than the angles of the thinner bars, in order that the parts may readily separate when the pressure which forces them together is relieved. The thicker inner wedge-bar employed with this construction is preferably formed integral with the carrier-plate, in order to insure its prompt release and the discontinuance of its wedging action on the outer bars. It will be obvious that the release of pressure from the bars 37$^a$ and 43$^a$ will diminish the pressure between the other bars and cause them to release quickly.

A preferred form of my improvement is illustrated in Fig. 10, but without limitation to the specific particular form or proportions shown therein. The number of the carrier-plates and the number of the wedge-bars formed integral therewith may be varied, and the number of the separate inner and outer wedge-bars may be increased or diminished and the angular inclination of their sides varied.

That portion of the housing which immediately surrounds the wedge-bars may be slightly tapered or conical in form on the inside, and the wedge-bars employed with this form of housing may be either tapered longitudinally, as shown in Figs. 14 and 15, or of uniform thickness or cross-sectional dimensions throughout their length, as shown in Figs. 12 and 13.

While I have shown and described the outer frame or casing of the draw-gear as specially adapted to be employed with my improved friction buffing apparatus the same or a similar construction may be employed with the ordinary forms of draw-gear, the shoulders 4 and 5 serving as stops or bearings for the follower-plates, between which the springs which surround the draft-pin in the ordinary forms of draw-gear may be located; or, if required, an additional stop or stops may be inserted between the shoulders 4 and 5 when the frame is employed with the ordinary forms of draw-gear.

As already stated, the present invention is an improvement, *inter alia*, on Patent No. 499,336, granted to me June 13, 1893, and partly as regards the structure of the case or framework which supports and carries the draft and buffer mechanism, and in this patent, as in that, I have kept in mind the building of a structure which, forming no part of the car-body proper, should be structurally separate therefrom and independent thereof, and, in a certain sense, should possess integrality of its own as a distinct machine or mechanical appliance, and I have adhered to this idea especially in this—that I make the entire structure so that it can be made and put together at the shops as a distinct appliance or mechanism by itself as complete and integral as a bolt-machine or a steam-engine and like them be at once and conveniently applied directly to the use for which it was intended without necessarily being taken apart and rebuilt. Thus my improved structure can be made and shipped direct from the shop and applied directly to a car, either when it is in the process of building or after it is built, or even to an old car. In furtherance of this idea I have dispensed with one of the three elements which in Patent No. 499,336 went to make up the rigid frame there referred to. I make this rigid frame now in two pieces, instead of three, properly secured together for convenient application direct to the car-body; also, in accomplishing this I have succeeded in so subdividing and reconstructing my present two-part frame that it accomplishes all the essential purposes and functions of my previous three-part frame, and also accomplishes them in a much more perfect manner, for it will be readily understood that the fewer the joints of subdivision the more perfectly will the frame answer its necessary purposes. Hence, while I am aware of many prior structures wherein the supporting and carrying frame made in separate pieces or sections and attached to or built onto the car-body so as to be structurally a part thereof and so that the draft and buffing mechanism might then be mounted or placed therein—as, for example, in Patent No. 439,046—it will readily be seen that in the making and development of my invention I have been working on other lines and for ends characteristically different from those which such inventors had in view. They built a draw and buffer frame onto the car. I build a draw and buffer frame onto the draw and buffer mechanism, so as to make a substantially integral machine thereof, which, when made, may be sold and shipped as a separate machine, and when it reaches the car-factory may readily be applied to the car as a structural attachment thereto and which, when so applied, will, on account of the peculiarity of its structure, be distinguishable by its own elements of superiority.

I claim as my invention and desire to secure by Letters Patent—

1. A casing or frame, for draw gear or buffing mechanism, consisting of but two parts or sections, and forming, when the sections are bolted together side by side, a striking plate, one part of which is located on each section, a draw bar stirrup, and a guide and support for the draft or buffing apparatus, substantially as set forth.

2. A frame or casing, for draw gear or buffing apparatus, consisting of two sections which form a guide and support for the draft or buffing apparatus, a longitudinal flange on the upper side of each section which is adapted to be bolted to the end sill and draft timbers of a car, a shoulder on the flange adapted to bear against the inner lower side of the end sill and an upward extension adapted to bear against the outer side of the end sill whereby longitudinal movement of the frame, in either direction, relative to the end sill is resisted, substantially as set forth.

3. A two part casing or frame for draw gear or buffing apparatus, wherein each part or section shall contain one portion or side of the striking plate, one side of the guide and support for the draw bar and one side of a guide and support for the buffing apparatus, substantially as set forth.

4. The combination, in a buffing apparatus, of intercalated frictional devices having inclined or wedge-shaped frictional surfaces, and means for pressing the frictional surfaces together, substantially as set forth.

5. The combination, in a buffing apparatus, of intercalated wedge-shaped frictional devices adapted to be forced into contact for the purpose of creating a frictional resistance, and means for forcing the surfaces into contact, substantially as set forth.

6. The combination, in a buffing apparatus, of frictional devices, a carrier for actuating the frictional devices in a transverse or lateral direction for the purpose of creating a frictional resistance, and means whereby longitudinal movement of the frictional devices will produce an increasing frictional resistance, substantially as set forth.

7. The combination, in a buffing apparatus, of frictional devices having beveled or wedge-shaped frictional surfaces, whereby they are adapted to be wedged together transversely, and longitudinally inclined surfaces, whereby they are adapted to be wedged together longitudinally, and means for forcing said frictional devices into contact, substantially as set forth.

8. The combination, in a buffing apparatus, of an outer and an inner series of wedge-shaped bars, carrier plates adapted to act on and wedge the inner series of bars between the members of the outer series, and means for actuating the carriers, substantially as set forth.

9. The combination, in a buffing apparatus, of a wedge block, carrier plates surrounding the wedge block, two series of wedges, or wedge-shaped bars, surrounding the carriers, the members of each series projecting into the spaces between the members of the other series, and means for limiting the outer movement of the wedges, substantially as set forth.

10. The combination, in a buffing apparatus, of a housing, frictional devices arranged in substantially cylindrical form within the housing, carrier plates formed of cylindrical segments, and means for actuating the carrier plates to force the surfaces into contact, substantially as set forth.

11. The combination, in a friction buffing apparatus, of a cylindrical housing, friction members located within the housing, carrier plates which are movable radially outward for forcing the surfaces of the frictional members into contact, and a wedge block in sliding contact with the carriers, whereby longitudinal movement of the draw bar may actuate the carriers to force the frictional members together, substantially as set forth.

12. The combination, with a friction buffing mechanism, of a frame or casing formed of two longitudinal sections, a housing for the friction buffing mechanism which is located between the two sections, and stops formed integral with the sections of the frame or casing for limiting the longitudinal movement of the housing, substantially as set forth.

In testimony whereof I have hereunto set my hand.

GEO. WESTINGHOUSE, JR.

Witnesses:
T. J. HOGAN,
F. E. GAITHER.